(No Model.)

I. E. MERRITT.
Gearing.

No. 238,516. Patented March 8, 1881.

Witnesses:
Willie O. Stark.
Al. Stark.

Inventor:
Isaac E. Merritt,
by Michael J. Stark,
Attorney.

N. PETERS, PHOTO-LITHOGRAPHER, WASHINGTON. D. C.

United States Patent Office.

ISAAC E. MERRITT, OF LOCKPORT, NEW YORK.

GEARING.

SPECIFICATION forming part of Letters Patent No. 238,516, dated March 8, 1881.

Application filed January 12, 1881. (No model.)

*To all whom it may concern:*

Be it known that I, ISAAC E. MERRITT, of Lockport, in the county of Niagara and State of New York, have invented certain new and useful Improvements in Gearing; and I do hereby declare that the following description of my said invention, taken in connection with the accompanying sheet of drawings, forms a full, clear, and exact specification, which will enable others skilled in the art to which it appertains to make and use the same.

This invention has general reference to gearing for mowing and other machines; and it consists in the peculiar combination of parts and details of construction, as hereinafter first fully set forth and described, and then pointed out in the claims, whereby the gearing is rendered adjustable in a manner as will presently be specified.

Figure 1:
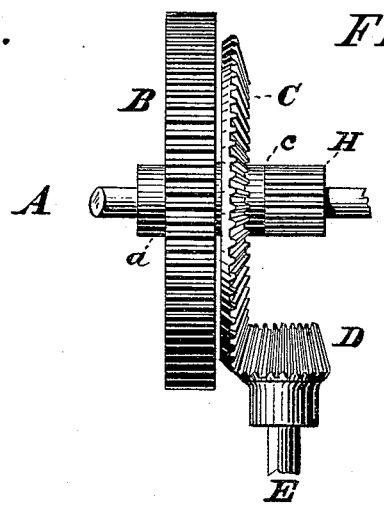
Figure 2:
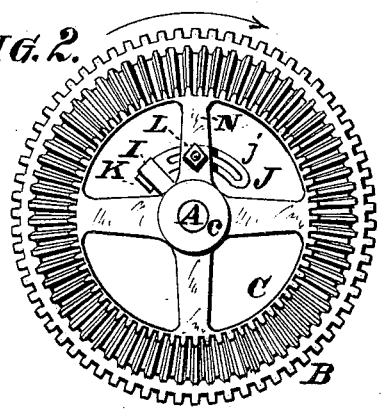
Figure 3:
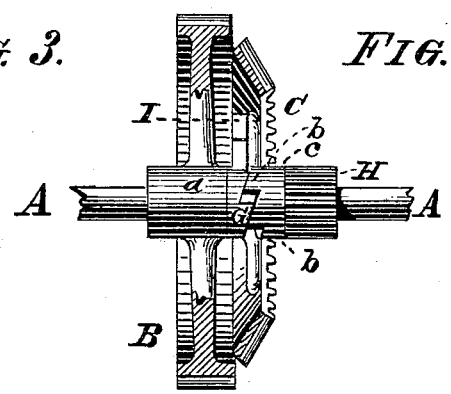
Figure 4:
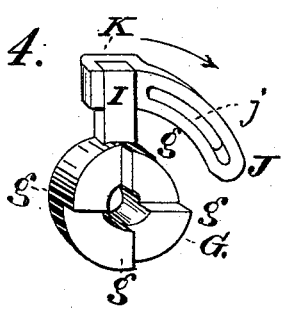

In the drawings already mentioned, Figure 1 is a plan of part of the gearing of a mowing or other machine. Fig. 2 is an end or face view of the same. Fig. 3 is a sectional plan, and Fig. 4 is an end view of the adjusting-washer.

Like parts are designated by corresponding letters of reference in all the figures.

A in these drawings represents the main axle of a mowing-machine, or the main driving-shaft of any other mechanism in which motion is transmitted to a shaft, E, by means of gearing.

B is the main spur-wheel, and C the main bevel-wheel.

D is the pinion on the shaft E. In mowing-machines motion is transmitted to this pinion D through a counter-gearing (not shown) having a pinion engaging the spur-wheel B, and a spur-wheel engaging a pinion, H, secured to or formed in one piece with the bevel-wheel C. In these machines it frequently happens that the pinion D wears out, or that, owing to the pressure exerted upon said pinion in causing it to revolve, the bearing for the shaft E wears out of line, and also that the wear on the hub of the wheel C causes the latter to slip the cogs of said pinion. It is furthermore often desirable to change the latter for another having a larger or smaller number of cogs than the one to be changed, in which case the bevel-wheel C must be moved closer to or farther away from the pinion D, as the case may be. Owing to the fact that this bevel-wheel C revolves loosely upon the axle A, it is rather difficult to change its position upon said axle, and the means now usually resorted to is to remove said wheel C, and to place upon or to remove from said axle washers introduced between the hubs of the wheels B and C, which operation requires considerable time, and is otherwise very objectionable. To avoid these drawbacks I place between the hub *a* and the hub *c* a washer, G, having in its face four (more or less) inclines, *g*, similar to clutch or ratchet teeth, and form on either the hub *c* or the hub *a* a like number of similar projections, *b*, meshing with said projections *g*, it being a matter of no consequence whether the inclines *b* are formed on the hub *c* or *a*. On said washer G, I furthermore provide an arm, I, which latter I engage with a slotted bar or sector, J, movably fixed to one of the spokes N of either said bevel-wheel C or the spur-wheel B by means of a bolt, L, as shown in Fig. 2. This sector J may embrace the arm I, as shown at K, or it may not, it being indifferent whether or not permanent connection is made between said sector and the arm I, as will hereinafter be mentioned.

It will now be readily understood that if the sector, and with it the washer G, be moved, (the wheels C or B remaining stationary,) say, in the direction of the arrow on Fig. 4, the inclines G, traveling upon the inclines *b* on the hub *c* or *a*, will cause the wheel C to move away from the wheel B, while a contrary movement of said sector will produce a reverse result.

It will now be further observed that in order to cause the bevel-wheel C to retain its position in mesh with the pinion D the washer G must be affixed to and revolve with either said bevel-wheel C or the spur-wheel B. In the present instance it is shown and constructed to be revolved by the sector J, secured to the bevel-wheel C by the bolt L.

In gearing for mowing-machines neither the bevel-wheel C nor the spur-wheel B ever revolve in opposite directions, and whenever such is the case the sector J may be so constructed that it pushes the washer G in a direction corresponding with the line of motion of the said bevel or spur wheels C B. In the present case the wheel C, revolving in the direction of the arrow on Fig. 2, said sector, if not connected with the arm I, should be on the opposite side of the arm I, so as to push on the same instead of pulling. I prefer, however, to connect the sector with the arm I in any desirable manner, so that the washer G will always revolve with the wheel to which it is attached, no matter in which direction it revolves.

I do not wish to confine myself to the number nor to the shape of the projections $g$, since other inclined surfaces or other means than those described may be devised to render the hub $a$ or $c$ extensible, and thereby obtain the results heretofore described.

I am aware that clutch mechanisms have been made in which the so-called "driver" and "driven" wheels, or two driven wheels, were connected by a sleeve having projections on one or both faces engaging similar projections on said wheels, said sleeve being invariably fixed upon the shaft by a feather and groove, with capability of lateral movement upon said shaft, the object of which said clutch-connection being to enable the driven wheel being brought into connection with or disconnected from the said shaft to receive from or discontinue motion with said shaft. To attain this result the driven wheel revolves loosely upon said shaft, but upon a fixed position—that is to say, it has no lateral movement, or capability of being laterally moved. It is therefore evident that the clutch-sleeve, although it may be constructed identically in the same manner as my washer G, is not capable of moving the driven wheel laterally upon the axle in the sense that my washer G moves the same, and it is, for this reason, as well as its well-understood functions of a clutch, not such a device as has reference to my present invention.

Having thus fully described my invention, I claim as new and desire to secure to me by Letters Patent of the United States—

1. In mowing and other machinery, the extensible hub on the wheel B or C, as and for the object specified.

2. In mowing or other machinery, the device for moving the bevel or other similar driving or driven wheel laterally upon its axis, which consists in interposing between said wheel and a fixed collar or other analogous part a collar or washer having in its face inclines engaging similar inclines on the said driver or driven wheel, said collar or washer being fixed to said driver or driven wheel and capable of being revolved upon said axis, whereby, by a partial revolution of said washer, the said driver or driven wheel is caused to move laterally upon said shaft away from said fixed part, substantially in the manner as and for the object specified.

3. The combination, with the wheel B, of the washer G, having inclines, as described, and an arm, I, the wheel C, and the sector J, adjustably fixed to either the wheel B or C and engaging the arm I, the whole being constructed for operation substantially in the manner as and for the object specified.

4. In mowing and other machinery, a wheel having an extensible hub, said hub consisting of a collar having on one only of its faces inclines engaging similar inclines on the hub of said wheel, said collar being adjustably attached to said wheel, with capability of being revolved around the central axis or center of said wheel, whereby the distance between the said wheel and the end of said collar is increased or diminished, substantially in the manner as and for the purpose indicated.

In testimony that I claim the foregoing as my invention I have hereto set my hand in the presence of two subscribing witnesses.

ISAAC E. MERRITT.

Attest:
JAMES CARTER,
FRANK HIRSCH.